United States Patent [19]
Fardeau et al.

[11] Patent Number: 4,977,605
[45] Date of Patent: Dec. 11, 1990

[54] BINARY QUANTIFICATION OF AN IMAGE HAVING MULTIPLE LEVELS OF GREYS

[75] Inventors: Michel G. J. Fardeau, Les Milles; Bruno J. M. Adamolle, Aix-En-Provence, both of France

[73] Assignee: Bertin & Cie, Plaisir, France

[21] Appl. No.: 207,051

[22] PCT Filed: Sep. 28, 1987

[86] PCT No.: PCT/FR87/00368
§ 371 Date: May 27, 1988
§ 102(e) Date: May 27, 1988

[87] PCT Pub. No.: WO88/02587
PCT Pub. Date: Apr. 7, 1988

[30] Foreign Application Priority Data

Sep. 30, 1986 [FR] France ................................ 86 13577

[51] Int. Cl.$^5$ ............................................. G06K 9/38
[52] U.S. Cl. ........................................ 382/51; 382/52; 382/53; 358/466
[58] Field of Search ...................... 382/50, 51, 52, 53; 358/466

[56] References Cited
U.S. PATENT DOCUMENTS

| 4,442,544 | 4/1984 | Moreland et al. | 382/53 |
| 4,468,704 | 8/1984 | Stoffel et al. | 382/53 |
| 4,575,768 | 3/1986 | Sakai et al. | 358/282 |
| 4,644,410 | 2/1987 | Schlichtig | 382/53 |

FOREIGN PATENT DOCUMENTS 0070161 1/1983 European Pat. Off. .

OTHER PUBLICATIONS

Hancock, Improved Dynamic Thresholding Algorithm for Image Binarization, 11-78, 2295-2297.
Yasuo Nakagawa et al., Some Experiments on Variable Thresholding, 12-78, 191-204.

Primary Examiner—David K. Moore
Assistant Examiner—Michael Razavi
Attorney, Agent, or Firm—A. W. Breiner

[57] ABSTRACT

Method for transforming a video type image having multiple levels of greys into a binary image, method wherein each pixel is either white or black. With each pixel of the initial image there is associated a partial image centered on said pixel and comprising a plurality of pixels in at least one dimension. If the histogram of the grey levels of said partial image is considered as bimodal (D>E), a threshold (S) median with respect to said histogram is selected. If the histogram is considered as monomodal (D<e), a threshold (S) outside said histogram is selected, the position of this threshold with respect to the histogram being determined by comparison of the latter with a preset mean background value (FM). Application to telecopy, electronic storage of documents and drawings, preprocessing in order to facilitate the reading of handwritten messages or recognition of patterns in general.

11 Claims, 4 Drawing Sheets

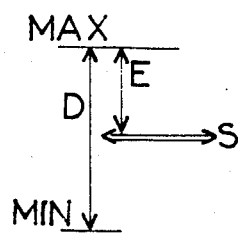
FIG.:3
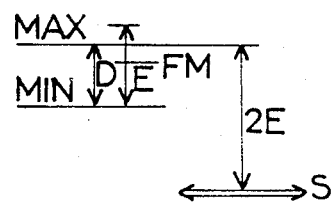
FIG.:4
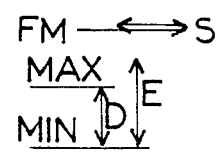
FIG.:5
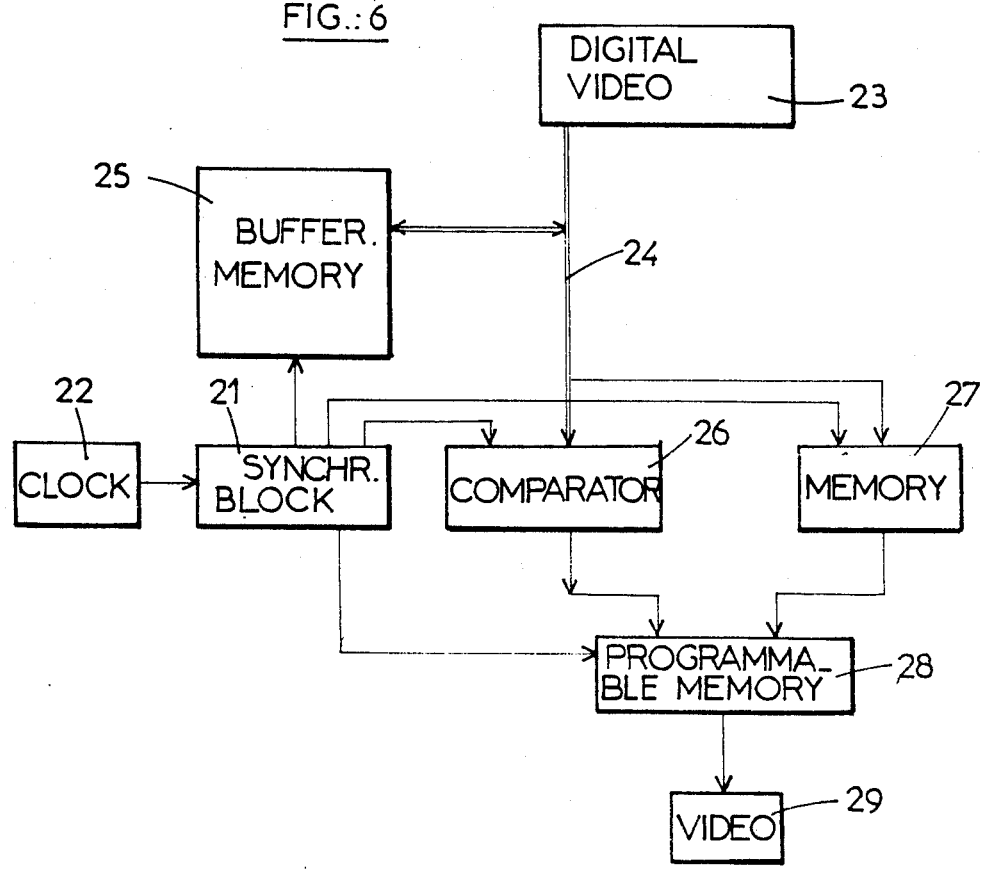
FIG.:6

BINARY QUANTIFICATION OF AN IMAGE HAVING MULTIPLE LEVELS OF GREYS

The present invention relates to a process and a device for transforming an initial video-type image, which may include a large number of different grey levels, for example 128 or 256, into a binary image, the darkest image points of the initial image being black on the transformed image, and the lightest image points of the initial image being white on the transformed image.

Such a transformation is necessary in various fields, especially in connection with the collection of information contained in graphics of a more or less dark shade, which graphics are carried by a more or less light support, for example with a view to telecopying, to storage, in electronic form, of documents and plans, to preprocessing for passing into an optical reader of printed characters, or alternatively of manuscript messages, or pre-processing with a view to the recognition of forms in general.

In such a process, for each image point or "pixel" of the initial image it is necessary to determine whether it should correspond to a "white" or "black" pixel of the transformed image.

This may be done by a method which involves the determination of a threshold for the grey levels.

In the simplest concept, the threshold level is fixed in advance, and it is the same for the entire image. This may falsify the message contained in the initial image, in cases where a part of the background, which is considered as light, is darker than the threshold level, or alternatively a part of the graphics is paler than the same threshold level, or vice versa.

It is possible to limit this risk by choosing a different threshold level for each image, this threshold level being determined from the histogram of the grey levels of the initial image. This histogram is usually bimodal, with two distinct maxima, one of which corresponds to the background and the other to the graphics, and the threshold will be fixed at the position of the minimum separating the two maxima of the histogram. However, it happens that this minimum lacks clarity or leads to poor results, particularly when the contrast is low and the background irregular.

It is known to improve this method by breaking down the initial image into a certain number of distinct elements, or windows, and to determine the histogram of the greys and the threshold for each window. This involves a complication of the computation, and reveals anomalies which may interfere with the information, on passing from one window to the other.

Another method does not rely upon the concept of grey intensity threshold, but on the concept of "contour" separating the background from the graphics.

The contour is determined by associating with the initial image a map of the spatial derivatives of the grey intensity. The contour is defined for all the pixels in which this derivative exceeds a minimum value. It is then sufficient to carry out a simple comparison to find whether the interior of a closed contour is to be white or black.

This method is well suited to variable-contrast images, but it necessitates numerous and complex computations.

A need therefore exists for a method which permits the transformation of images with multiple grey levels into a binary image, with a good reliability, even if the contrast is poor, while not necessitating computations as complex as the method indicated herein above.

In order to achieve this object, the invention provides a process for transforming an initial video-type image with multiple grey levels into a binary image, in which the initial image is broken down into a certain number of partial images, a grey level threshold is determined for each partial image and a value corresponding to black or to white of the transformed image is allocated to the central pixel of the partial image, depending upon whether it has a grey level exceeding or below the said threshold. According to the invention, a particular feature of this process is that there is associated with each pixel of the initial image a partial image centered on the said pixel and comprising a plurality of pixels in at least one dimension; and, if the histogram of the grey levels of this partial image is considered as bimodal, a median threshold is selected with respect to this histogram, if the histogram is considered as monomodal, a threshold outside this histogram is selected, the position of this threshold with respect to the histogram being determined by comparison of this histogram with a preset mean background value.

According to a procedure which contributes a significant simplification, in order to decide whether the histogram is to be considered as bimodal or monomodal, a determination is made of the difference between the highest and lowest grey levels of the partial image, and this difference is compared with a difference value selected in advance. Thus, it is sufficient to determine the difference between the figures designating the highest and lowest grey levels and to compare this difference with a preset value.

Advantageously, if the histogram is considered as bimodal, the threshold is determined by subtracting a constant value from the highest grey level, this value being less than the said difference value, or alternatively, this constant value is added to the lowest grey level. The determination of the threshold is thus also simplified.

It is possible to achieve a further simplification of the process by providing that the partial image is a star with n branches, which is centered on the pixel under consideration and the branches of which have the width of a pixel, and even, in the case where the relevant part of the image is formed of parallel lines, for example, a bar code, it is possible to provide that the partial image is a line which is perpendicular to the lines of the graphics and which is formed of a series of consecutive pixels, which series is centered on the pixel under consideration; this corresponds to a star which would have only two opposite branches.

Preferably, the dimensions of the partial image, or the greatest dimension of the latter, are approximately equal to the greatest spatial period of the graphics which carries the information which it is desired to transmit or to retain.

Advantageously, the mean background value is obtained from the entire initial image or from a part of this initial image which is significantly larger than the partial image and which includes the latter. For example, if the dimensions of the partial image are approximately 1 mm, those of the image part will be of the order of one centimetre.

Preferably, if the initial image is of the "dark inscriptions on a light background" type, the mean background adopted is the mean of the lightest greys of the partial images of the initial image or of the considered part of the this image, and conversely in the case of an image of the "light inscriptions on a dark background" type.

The invention will now be explained in greater detail with reference to a non-limiting practical example which is illustrated by the drawings, in which:

FIGS. 3, 4 and 5 are diagrams illustrating the three modes of determination of the threshold.

FIG. 6 is a diagram of a device wired to implement the invention.

Figure 1:
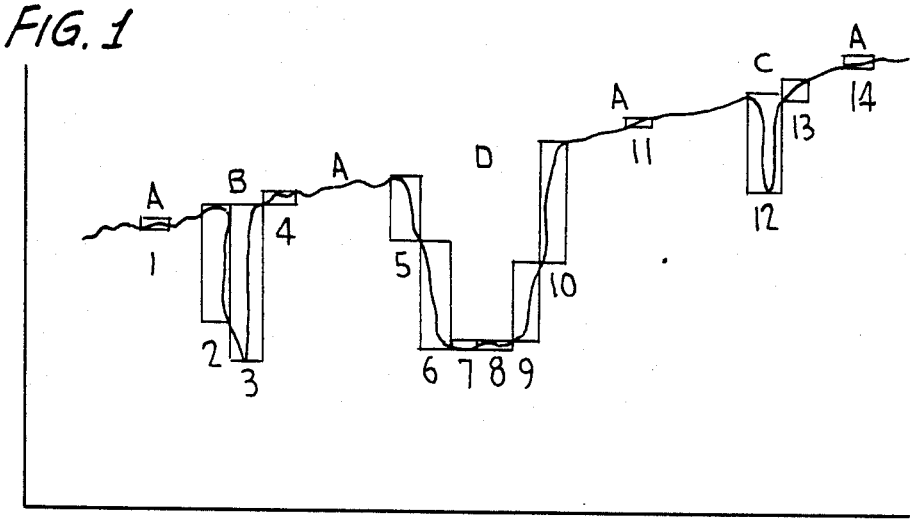
FIG. 1 is a brightness diagram along a line of an initial image.

FIG. 1 is a diagram of the luminous intensity along a line traversing a fraction of an initial image representing a light support on which dark indications have been inscribed. The curve shown in solid lines shows the variations of this luminous intensity, the light background corresponding to the high parts of the curve, and the inscriptions to the depressions. The curve shows portions A with small fluctuations, but with a total drift, which correspond to the background. The fluctuations constitute a background noise due to the irregularities of the support or of the detecting means. The curve further shows narrow depressions B, C and a broad depression D. These depressions correspond to the traversing of parts of the graphics. Small rectangles 1, 2 make evident, for various sections of the curve, which may correspond to partial images or "pavings", the maximum and the minimum of each section.

It is easy to establish that the height of the rectangles 1, 4, 11 and 14, which are situated on the portions A, is very small, and is essentially due to the background noise. This corresponds to a monomodal histogram. The height of the rectangles 2, 3 and 12, which correspond to the narrow depressions B and C is, on the other hand, very large. The same applies to the rectangles 5, 6, 9 and 10 which are situated on the two edges of the broad depression D. On the other hand, the rectangles 7 and 8 which are situated in the base of this depression are themselves also of small height.

The observation of this figure shows, first of all, that the usual technique, based upon the use of a single threshold for the entire image or for a window will not permit the detection of the small depression C, because of the general drift of the background, unless a window is selected which has a dimension markedly smaller than the length of FIG. 1. On the other hand, the process of the invention permits the detection of this depression with certainty.

In the case of the broad depression D, the single consideration of the monomodality or bimodality of the histogram would permit the distinguishing only of the contours of the depression. In order to distinguish the rectangles 7 and 8 of the base of the depression from those of the portions A, recourse is had to the concept of "mean base", this being determined from the entire initial image or from a part of the latter. In the general case, where it is necessary to process dark inscriptions on a light background, the portions A, which are the most numerous, have the maximum luminous intensity. The "mean background" will preferably be taken as being the mean of the maxima of the rectangles of the initial image or of the initial image fraction considered. This eliminates from the computation the small depressions and the edges of the broad depressions.

The operation will be carried out in a symmetrical manner in the case of a dark background.

Figure 2:
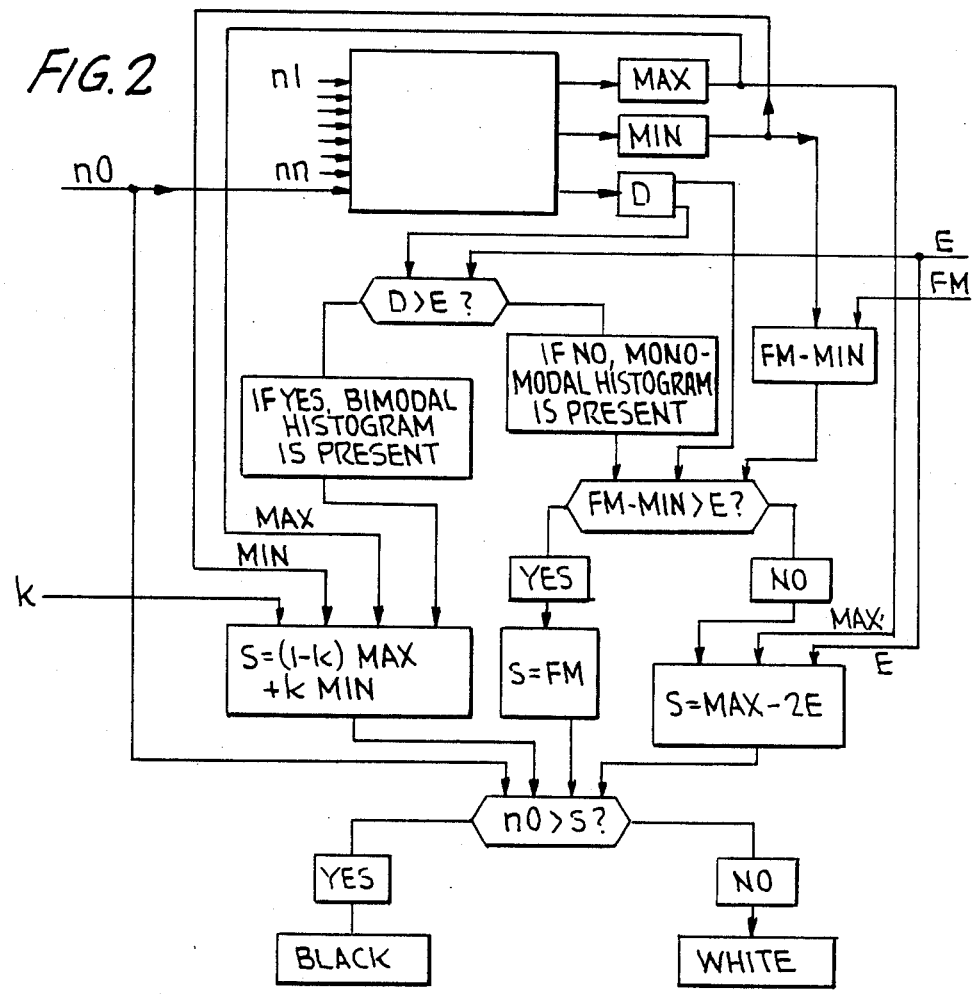
FIG. 2 is an organigram showing the steps of the process.
Figure 7:
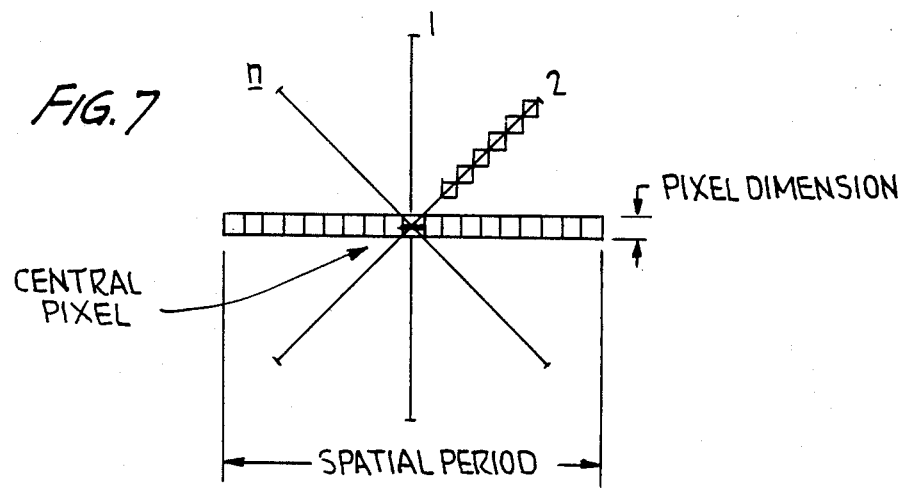
FIG. 7 illustrates a partial image in the form of a star with n number of branches centered on the pixel being considered, with the branches having a width corresponding to the width of the pixel considered. The greatest dimension of the partial image is approximately equal to the spatial period of the image to be transmitted.
Figure 8:
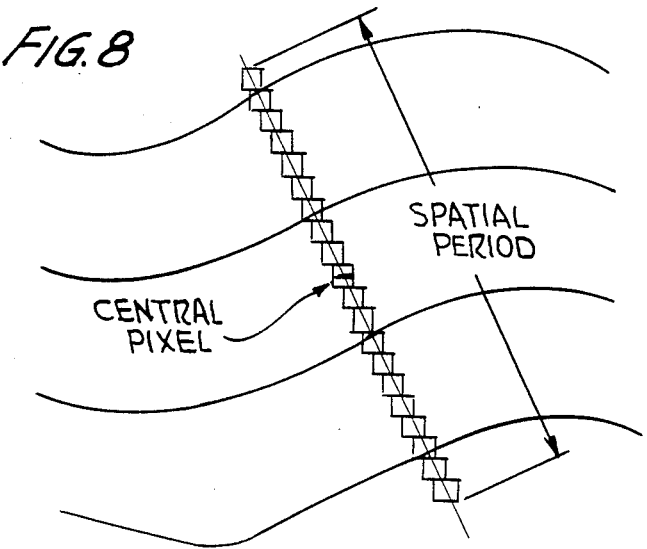
FIG. 8 illustrates an image formed of parallel lines wherein the partial image is a line perpendicular to the lines of the image and formed of a series of consecutive pixels which is centered on the pixel considered.
Figure 9:
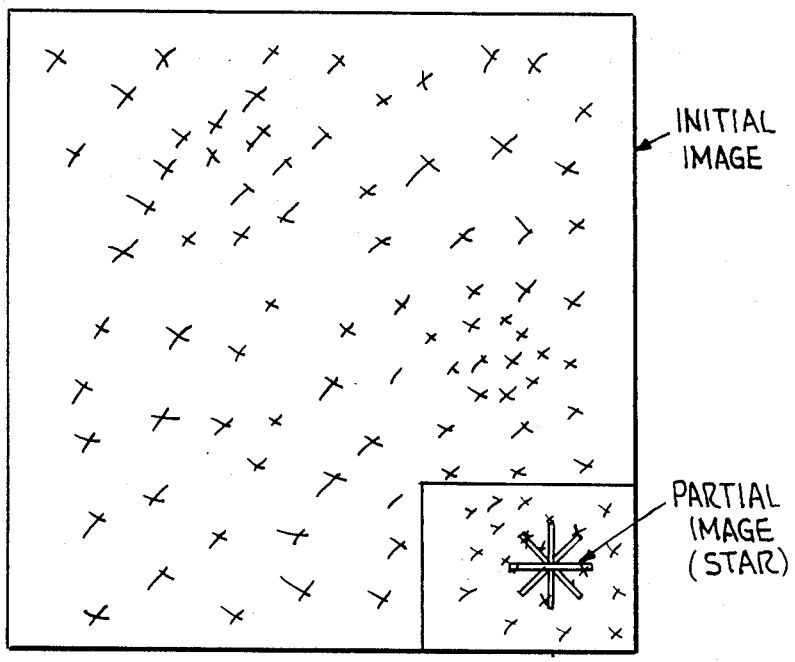
FIG. 9 illustrates an entire initial image and the partial image included therein wherein the images have dark inscriptions on a light background.
Figure 10:
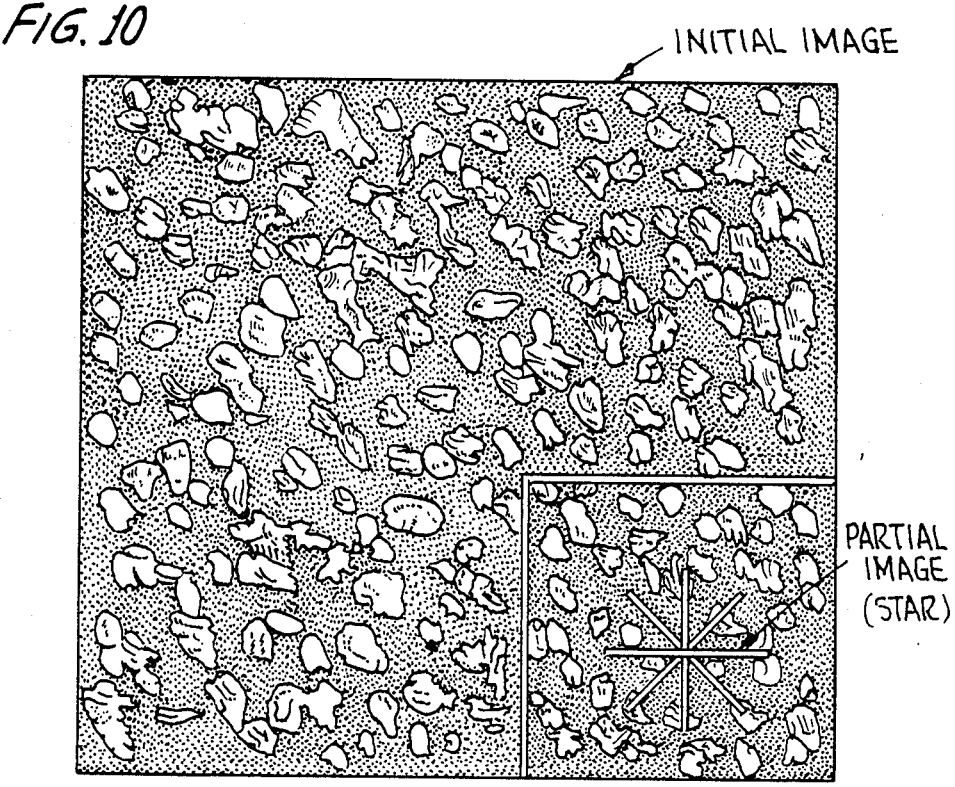
FIG. 10 illustrates an entire initial image and the partial image included therein wherein the images have light inscriptions on a dark background.

The organigram of FIG. 2 shows the progress of the steps of the process.

The necessary data will be placed in memory in advance, these data being: E, FM and k, the significance and the use of which will be stated herein below.

There then follows the processing of the grey level $n_0$ of the pixel considered, the grey levels $n_1$ $n_2$ ... n.n. of the other pixels of the partial image which includes the pixel considered. The maximum and minimum levels, MAX and MIN as well as $D=MAX-MIN$, are extracted therefrom. D and E are then compared. If D is greater than E, it is possible to consider that there is a bimodal histogram. The value of the threshold S is determined by $$S=(1-k)MAX+k\,MIN,$$

k being a coefficient which is normally within the range between 0.3 and 0.7. In particular, if k=0.5

$$S=\tfrac{1}{2}(MAX+MIN).$$

If D is less than E, there is a monomodal histogram. It is therefore necessary to know whether the case of a zone A or of a zone D of FIG. 1 is involved.

In order to achieve this, MIN is compared with the mean background FM which is stored in memory in advance, and in order to achieve this FM−MIN is computed.

If FM−MIN is less than E, the location is on the background (zone A). It is necessary to note that it is for the sake of simplicity that FM−MIN is compared with E; it would be possible to select a value E' different from the value E used elsewhere.

For a zone A, S is determined by:

$$S=MAX-2E.$$

The selection of the number 2 is itself also arbitrary.

If FM−MIN is greater than E, the location is within a broad depression (zone D).

The following is then adopted:

$$S=FM$$

It is then sufficient to compare $n_0$ and S in order to establish whether the pixel considered will come in black or white in the transformed image.

FIGS. 3, 4 and 5 show the three modes of determination of S.

The invention may be implemented with the aid of software, or with the aid of a hardware device.

In the case of a wired hardware system, it is possible to achieve simplifications as a function of the known characteristics, such as contrast, special frequency of the graphics, etc..., of the documents to be put in binary form.

By way of illustration, FIG. 6 gives the diagram of a simplified embodiment.

A synchronizing block 21 generates the necessary signals and transmits them to the other components of the device. The synchronizing block 21 is driven by a clock 22. A digital video 23, with n bits (n=6 for example) is connected via a bus 24 on the one hand to a buffer memory 25 of a current image zone including a sufficient number of video lines, and on the other hand to a comparator 26, which maintains the maximum value between two values presented in succession. The video 23 is also connected to a memory 27, of 1 octet, corresponding to a pixel.

The device further includes a programable memory 28, the signals of which feed a binary video 29, and which receives signals on the one hand from the memory 27 and on the other hand from the synchronizing block 21, and furthermore from the comparator 26. The operation of this device will readily be comprehended by a person skilled in the art.

The various pixels supplied by the digital video 23 are directed to the buffer memory 25 via the bus 24. It is the synchronizing block 21 which progressively supplies the storage addresses of the various video pixels.

Between two cycles of storage of the video pixels the synchronizing block 21 processes the addresses of the n pixels of the partial image and of the central pixel of this image, in order to ensure their transfer, via the bus 24, on the one hand to the comparator 26 and on the other hand to the memory 27.

The comparator 26 compares the pixels which are offered it sequentially, this taking place two by two, in order to determine the maximum.

The synchronizing block 21 then drives the programmable memory 28, which defines a threshold as a function of a maximum value emanating from the comparator 26 and from the value of the current pixel emanating from the memory 27, in order to decide whether the pixel stored in memory at 27 is to be considered as black or as white, and thus to generate a signal to be transmitted to the binary video 29.

A person skilled in the art will readily comprehend that the proposed scheme may be supplemented by a circuit for the computation of MIN and a circuit for the computation of FM. In this case, the programmable memory 28 is replaced by programmable memories in cascade, permitting the number of input bits compatible with the set of circuits which are connected to it to be obtained in this manner.

We claim:

1. A process for transforming an initial video-type image having multiple grey levels into a binary image comprising:
    (a) establishing a representation of grey levels of a partial image which is centered on a pixel of an initial video-type image with said partial image comprising a plurality of pixels in at least one dimension,
    (b) processing said representation of said grey levels to determine whether the distribution of said grey levels of said partial image corresponds to a monomodal or a bimodal histogram,
    (c) selecting a threshold such that (1) when said distribution of said grey levels is concluded to be a bimodal histogram, said threshold is within a range between the highest and the lowest grey levels and (2) when said distribution of said grey levels is concluded to be a monomodal histogram, said threshold is outside said range between the highest and the lowest grey levels and the value of said threshold is determined by comparing said representation of said grey levels with a preset means background value,
    (d) allocating to said pixel a value corresponding to black or to white of said image as transformed, depending on whether said pixel has a grey level exceeding or below said selected threshold, and
    (e) repeating steps (a) to (d) for each pixel of said initial image.

2. The process according to claim 1 wherein said processing of step (b) includes:
    (i) determining the difference between the highest and the lowest grey levels of said partial image,
    (ii) comparing said difference with a first preset difference value, and
    (iii) when said difference is determined to be greater than said first preset difference value, concluding that the distribution of said grey levels corresponds to a bimodal histogram and when said difference is determined to be less than said first preset difference value, concluding that the distribution of said grey levels corresponds to a monomodal histogram.

3. The process according to claim 2 wherein said threshold selected according to step (c)(1) is calculated utilizing the formula:

$$S=(1-k)MAX+k\,MIN$$

wherein
S is the grey level value of said threshold,
MAX is the highest grey level value of said partial image,
MIN is the lowest grey level value of said partial image, and
k is a coefficient with the range between 0.3 and 0.7.

4. The process according to claim 1 wherein step (c)(2) includes:
    (i) comparing the difference between said preset mean background value and said lowest grey level value of said partial image with a second preset difference value, and
    (ii) attributing said threshold a first value if said difference is less than said second preset difference value and a second value if said difference is greater than said second preset value.

5. The process according to claim 4, wherein said first value of said threshold is calculated by subtracting a constant value from said highest grey level value and said second value of said threshold is calculated to be equal to said preset mean background value.

6. The process according to either claim 2 or 4 wherein said first and second preset difference values are equal.

7. The process according to claim 1 wherein said partial image is in the form of a star with n number of branches, with said branches being centered on said pixel being considered and having a width corresponding to the width of a pixel.

8. The process according to claim 1 wherein said initial image is a graphic formed of parallel lines and said partial image is a line formed of a series of consecutive pixels and is centered on said pixel being considered, said partial image line being perpendicular to said parallel lines of said initial image.

9. The process according to claim 1 wherein the greatest dimension of said partial image is approximately equal to the spatial period of a graphic in said initial image representing information to be stored or transmitted.

10. The process according to claim 1 wherein said preset mean background value is obtained from the entire initial image or from a part of said initial image which is significantly larger than said partial image and which includes said partial image.

11. The process according to claim 10 wherein when said initial image has dark inscriptions on a light background, the mean of the lightest greys of said partial image of said initial image or said part of said initial image which is larger than said partial image is adopted as said mean background value, and when said initial image has light inscriptions on a dark background, the mean of the darkest group of said partial image of said initial image or of said part of said initial image is adopted as said mean background value.

* * * * *